United States Patent [19]
Taricco

[11] Patent Number: 6,078,166
[45] Date of Patent: Jun. 20, 2000

[54] APPARATUS AND METHOD FOR RECHARGING A BATTERY BY USING A FEEDBACK NOISE SIGNAL FROM THE BATTERY

[76] Inventor: Todd Taricco, P.O. Box 1547, Zephyr Cove, Nev. 89448

[21] Appl. No.: 09/080,414

[22] Filed: May 18, 1998

Related U.S. Application Data

[63] Continuation-in-part of application No. 08/835,034, Mar. 27, 1997, Pat. No. 5,783,929.

[51] Int. Cl.$^7$ ..................................................... H02J 7/00
[52] U.S. Cl. .......................................... 320/141; 320/139
[58] Field of Search ..................................... 320/139, 141

[56] References Cited

U.S. PATENT DOCUMENTS

| | | | |
|---|---|---|---|
| 4,234,839 | 11/1980 | King et al. | 320/150 |
| 4,740,739 | 4/1988 | Quammen et al. | 320/129 |
| 4,871,959 | 10/1989 | Gali | 320/101 |
| 5,084,664 | 1/1992 | Gali | 320/101 |
| 5,146,395 | 9/1992 | McKie | 363/13 |
| 5,276,393 | 1/1994 | Gali | 320/101 |
| 5,444,354 | 8/1995 | Takahashi et al. | 322/28 |
| 5,541,495 | 7/1996 | Gali | 320/165 |
| 5,633,575 | 5/1997 | Gali | 320/140 |
| 5,648,714 | 7/1997 | Eryou et al. | 320/139 |
| 5,891,590 | 4/1999 | King | 429/49 |

*Primary Examiner*—Peter S. Wong
*Assistant Examiner*—Gregory J. Toatley, Jr.
*Attorney, Agent, or Firm*—Blakely Sokoloff Taylor & Zafman

[57] ABSTRACT

An apparatus and method for recharging a battery. The battery recharger may provide a rail voltage to the battery which is modulated by a noise signal. The modulation of the rail voltage may induce a resonant excitation of the sulfate crystals in the battery. The resonant excitation of the battery may be fed back or fed forward to the modulator to create and/or enhance the noise on the rail voltage.

13 Claims, 6 Drawing Sheets

APPARATUS AND METHOD FOR RECHARGING A BATTERY BY USING A FEEDBACK NOISE SIGNAL FROM THE BATTERY

This is a Continuation-in-part (CIP) of prior application Ser. No. 08/835,034 filed Mar. 27, 1997, now U.S. Pat. No. 5,783,929

BACKGROUND OF THE INVENTION

1. Field of the Invention

The present invention relates to an apparatus and method for recharging a battery.

2. Description of Related Art

A battery may be recharged by applying power to the device for a period of time. There have been developed various methods for applying power to recharge a battery. One method is to provide a continuous charging current that induces a change in the chemical composition of the battery. Such a method requires a relatively large charging current which tends to overheat and warp the battery plates. Additionally, it is has been found that a DC charge will not always fully restore the battery.

U.S. Pat. No. 4,740,739 issued to Quammen et al. discloses a method for charging a battery which includes the step of periodically allowing the battery to discharge during the charging process. In the Quammen method a continuous charging current is applied to the battery. The Quammen charging apparatus includes a pulse train generator and an electronic switch that are coupled to the battery. The pulse train generator periodically drives the switch so that a discharge current flows from the battery. The pulse train generator drives the switch every 600 to 1200 microseconds.

U.S. Pat. Nos. 4,871,959; 5,084,664 and 5,276,393 issued to Gali disclose a solar powered battery charger. The Gali battery chargers include a DC to AC converter which applies a pulsed current to the battery. The '393 patent discloses a waveform applied to the battery that is a series of very sharp pulses provided at a frequency between 10,000 and 100,000 hertz. The pulses have a rise time of less than 100 nanoseconds. Gali claims that this series of short pulses will generate a ringing signal in the battery that matches the resonant frequency of the battery. Gali further claims that the battery can be recharged with such pulses without providing a continuous charging current to the device. The low power requirements allow Gali to utilize a solar conversion energy source.

U.S. Pat. No. 5,648,714 issued to Eryou et al. discloses a battery recharger which utilizes a transistor switch and an inductor to introduce a series of short pulses in a DC current that is used to charge a battery. The repetitive rate of the pulses appears to be less than 2500 hertz.

It has been found that the recharging methods of the prior art are not always successful in fully restoring a depleted battery. It would be desirable to provide an apparatus and method for fully restoring any battery.

SUMMARY OF THE INVENTION

The present invention is an apparatus and method for recharging a battery. The battery recharger may provide a rail voltage to the battery which is modulated by a noise signal.

DETAILED DESCRIPTION OF THE INVENTION

One embodiment of the present invention is an apparatus and method for recharging a battery. The battery recharger may provide a rail voltage to the battery which is modulated by a noise signal. The modulation of the rail voltage may induce a resonant excitation of the sulfate crystals in the battery. The resonant excitation of the battery may be fed back or fed forward to the modulator to create and/or enhance the noise on the rail voltage.

Figure 1:
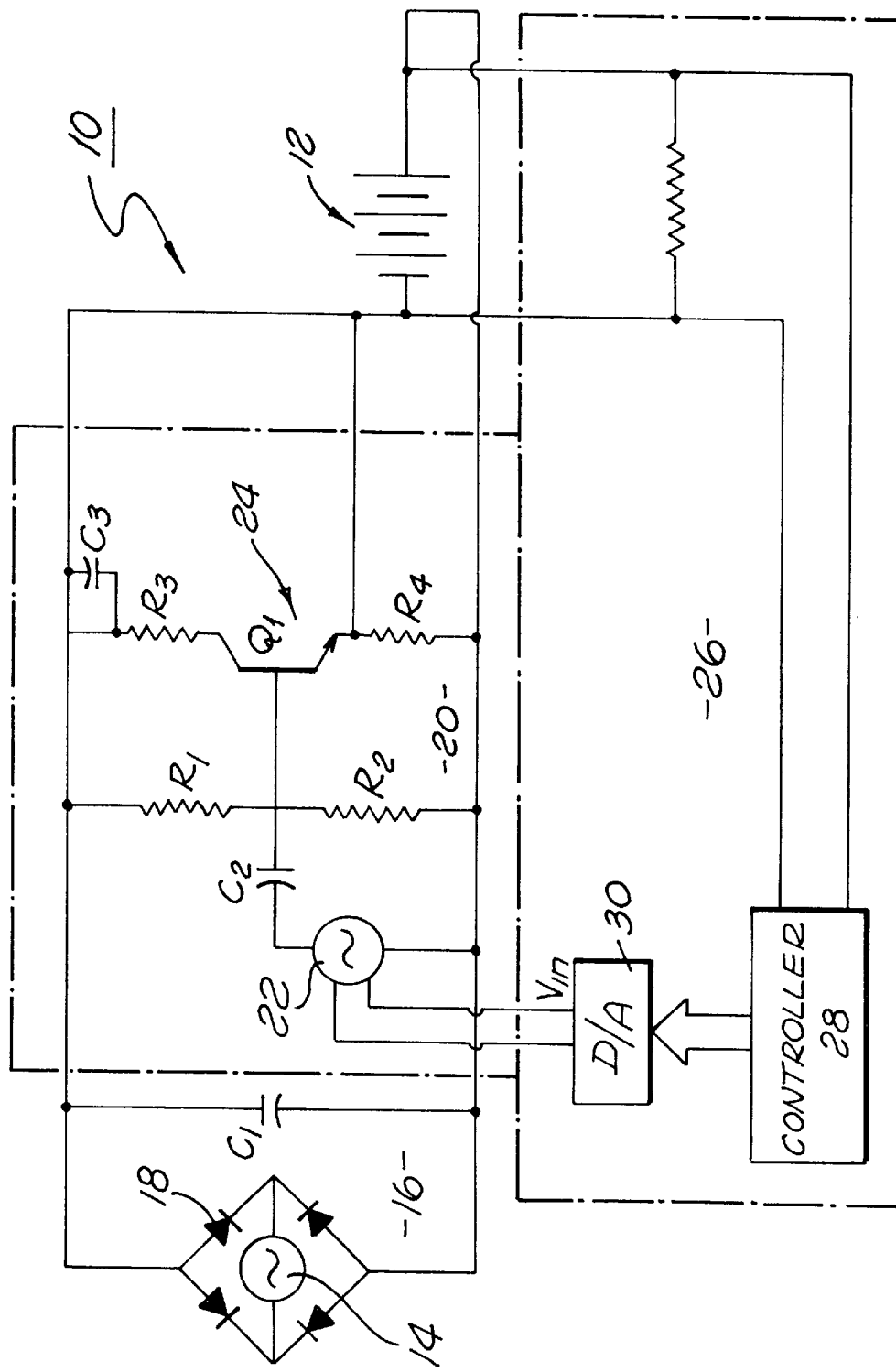
FIG. 1 is a schematic of an apparatus of the present invention.

Referring to the drawings more particularly by reference numbers, FIG. 1 shows a battery recharging apparatus 10 of the present invention. The apparatus 10 is used to recharge a battery 12. The battery 12 is typically a lead-acid DC battery that is used in vehicles such as automobiles or aircraft. Although it is to be understood that the present invention may be used to charge other types of batteries. The battery 12 is typically depleted so that is does not provide a sufficient current. The battery 12 contains plates, terminals, fluid, etc., which create a circuit that has a natural resonant frequency.

The apparatus 10 can be plugged into an AC power source 14 such as a municipal power line. The apparatus 10 includes a full wave rectifier 16 which converts an AC voltage from the power source 14 to a DC voltage, which will be referred to as the rail voltage. The rectifier 16 may include a plurality of diodes 18 and an output capacitor $C_1$ for rectifying the AC voltage and providing a constant rail voltage. The rail voltage is applied to the battery terminals. The battery 12 is thus provided with continuous charging current up to a maximum voltage for the battery temperature.

Figure 2:
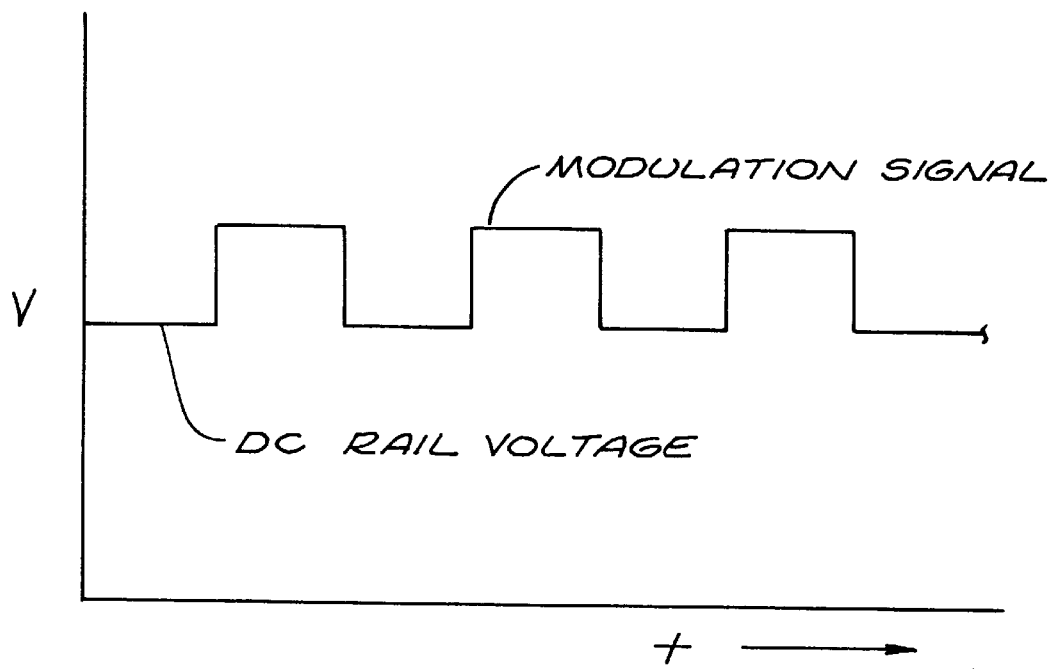
FIG. 2 is a graph showing a modulated rail voltage that is applied to a battery.

The capacitor $C_1$ is coupled to a modulation circuit 20 that modulates the rail voltage with a modulation signal. FIG. 2 shows the waveform of the voltage that is applied to the battery 12. The waveform includes a DC level and a modulation signal modulated onto the DC signal. In the preferred embodiment, the modulation signal oscillates at a frequency that corresponds to the natural resonant frequency of the battery 12. It has been found that such a modulated rail voltage will fully restore almost any discharged battery. In the preferred embodiment the modulation frequency is in the radio frequency range above 10,000 hertz. Although a frequency range between 10 and 40,000,000 hertz has been demonstrated to provide satisfactory results. It has been found that frequencies of 0.215, 0.312 and 0.612, 1.825 and 1.875 megahertz provide the best results when recharging a lead-acid battery. The rail voltage typically ranges between 1.2 to 50 volts, preferably at least 15 volts. In addition to the resonant frequency the output of the battery may include multiple harmonic frequencies.

The modulation circuit 20 may include an oscillator 22 which drives an electronic switch 24. The oscillator 22 may be a voltage controlled variable waveform generator that can provide a modulation signal having a desired waveform at a desired frequency. By way of example, the oscillator 22 may produce a square wave or a sawtooth waveform.

In the preferred embodiment the electronic switch 24 is a common collector emitter follower amplifier circuit which contains an npn bipolar junction transistor (BJT) $Q_1$. The base junction of the transistor $Q_1$ is connected to DC biasing resistors $R_1$ and $R_2$. The biasing resistors $R_1$ and $R_2$ are coupled to the oscillator 22 by a by-pass capacitor $C_2$. The collector junction of the transistor $Q_1$ is connected to a collector resistor $R_3$ and a by-pass capacitor $C_3$. The emitter junction of the transistor $Q_1$ is connected to a emitter resistor $R_4$. The emitter resistor R4 is coupled to the battery 12.

The chemical composition of the battery changes during the charging process. This change may vary the resonant natural frequency of the battery 12. The apparatus 10 may further include a follower circuit 26 that varies the modulation frequency of the modulation signal to follow the natural resonant frequency of the battery 12. The follower circuit 26 may include a microcontroller 28 which has input terminals that sense the voltage of the battery 12 through resistor $R_5$. In the preferred embodiment the microcontroller 28 is a digital signal processor (DSP) which can analyze the battery voltage waveform. The controller 28 can analyze the waveform to determine whether the modulation signal is oscillating at the resonant frequency of the battery 12.

The microcontroller 28 can provide output commands to vary the modulation frequency generated by the oscillator 22. The microcontroller 28 may be coupled to the oscillator 22 by a digital to analog (D/A) converter 30. The controller 28 provides an output command in a binary format which is converted by the D/A 30 to an analog signal that is the input voltage $V_{in}$ for the oscillator 22.

In operation, the controller 28 may initiate a frequency sweep by varying the modulation frequency of the modulation signal in accordance with a predetermined algorithm. The controller 28 may also sense the voltage of the battery 12 to determine the natural resonant frequency of the device 12. The controller 28 can then provide output commands so that the oscillator 22 generates a modulation signal at the resonant frequency. If the controller 28 senses a change in the natural resonant frequency, the controller 28 can initiate another sweep to again determine the resonant frequency. The secondary sweep typically has a smaller range than the initial sweep. The controller 28 can continue this routine until the battery 12 is sufficiently recharged.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Figure 3:
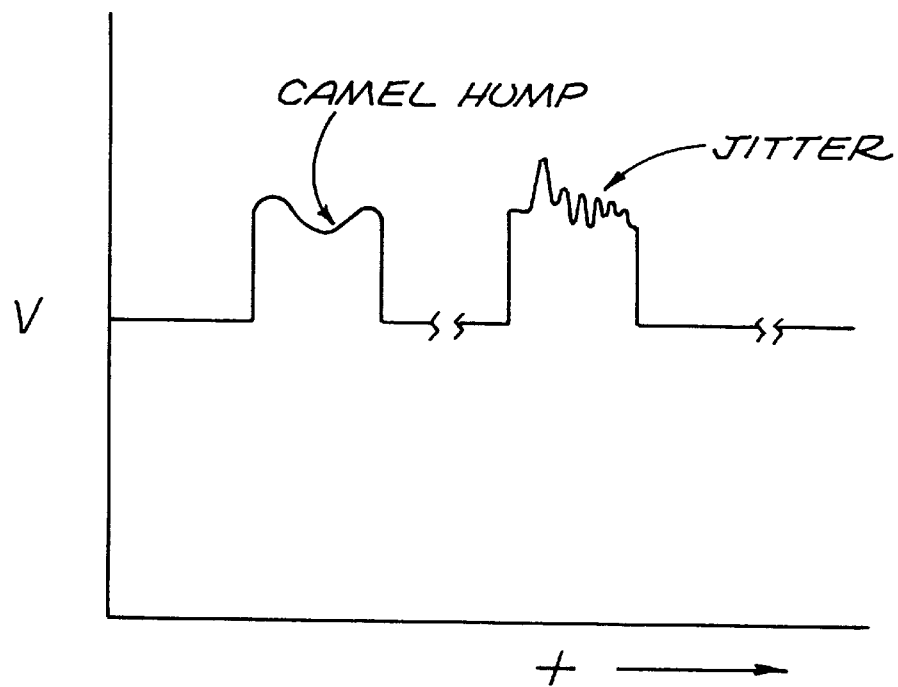
FIG. 3 is a graph showing an output voltage of the battery during the process of recharging.

For example, FIG. 3 shows output signals measured from the battery. Modulation frequencies which create a camel hump or jitter have been found to efficiently recharge a battery 12. The controller 28 can therefore analyze the waveform to determine the existence of a camel hump and/or jitter and then lock into the modulation signal that produced the desired waveform characteristics.

Figure 4:
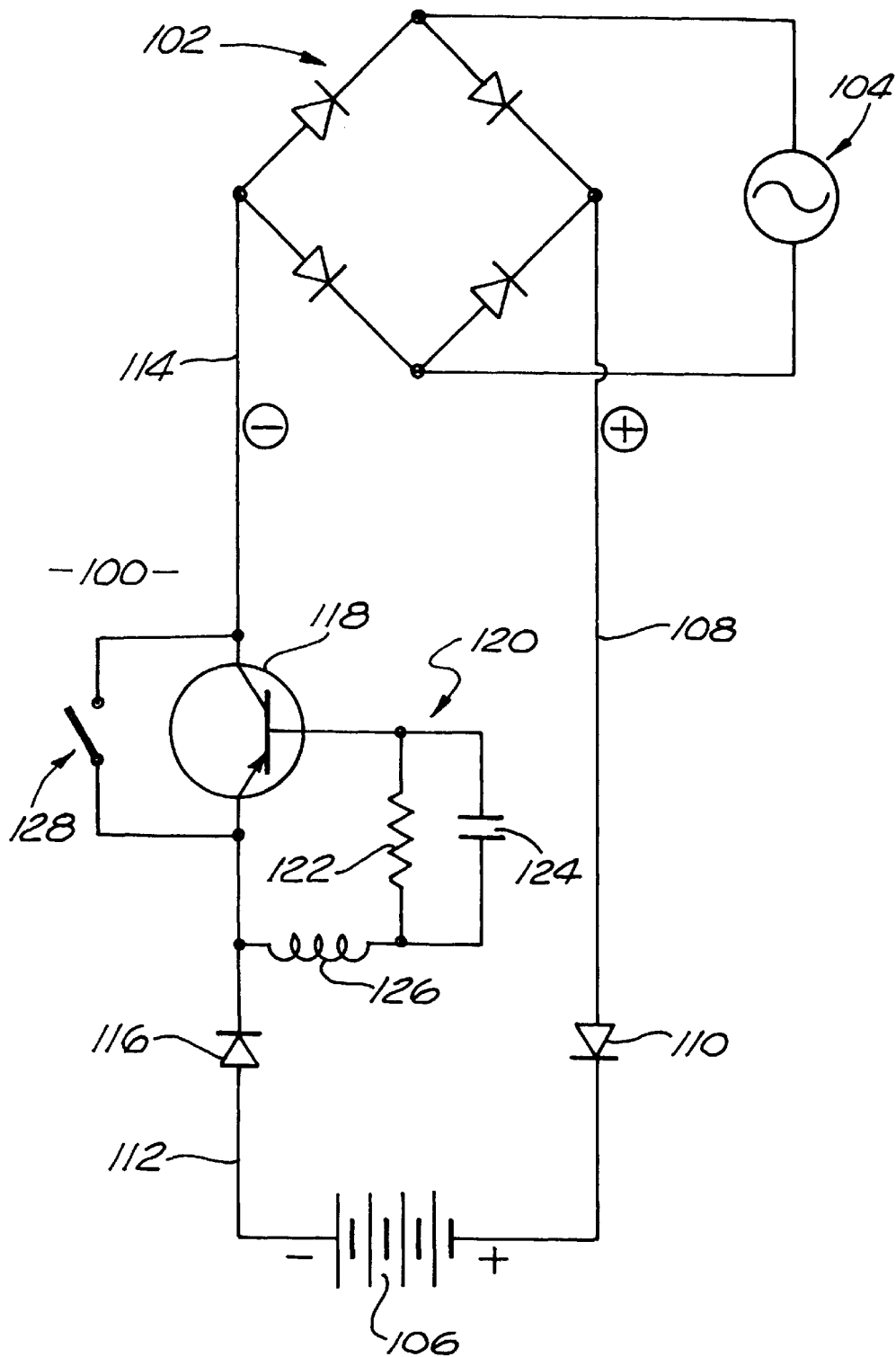
FIG. 4 is a schematic of an alternate embodiment of the apparatus.

FIG. 4 discloses an embodiment of a battery recharger apparatus 100 which modulates the rail voltage with a noise signal. Noise can be defined as the superimposition of an extra signal fluctuation(s) on a signal f(x) which causes the signal to assume unpredictable values at each time instant t.

The apparatus 100 includes a full wave rectifier 102 that is connected to a source of power 104. The source of power 104 typically provides an AC power signal which is rectified by the rectifier 102. The rectifier 102 is connected to a positive terminal of a battery 106 by line 108. The line 108 may have a diode 110 to prevent a reverse flow of current from the battery 106 to the rectifier 102. The rectifier 102 may be connected to the negative terminal of the battery 106 by lines 112 and 114. The line 112 may include a diode 116 to prevent a reverse flow of current into the battery 106. The rectifier 102 provides a rail voltage to the battery 106. The rail voltage may be a rectified sinusodial AC signal. Alternatively, the apparatus 100 may include a capacitor (not shown) to create a DC rail voltage that is supplied to the battery 106.

The apparatus 100 may also include a transistor 118 which modulates the rail voltage provided to the battery 106. The transistor 118 may be a pnp type device which has an emitter connected to the battery 106 by line 112 and a collector connected to the rectifier 102 by line 114.

The base of the transistor 118 may be connected to line 112 by an RLC circuit 120. The RLC circuit 120 may include a resistor 122, a capacitor 124 and an inductor 126. Although all three devices 122, 124 and 126 are shown and described, it is to be understood that any combination of devices may be used in the apparatus 100. For example, the apparatus 100 may include an RC circuit which has only a resistor 122 and a capacitor 124, or an RL circuit which has a resistor 122 and an inductor 126. The lines 112 and 114 can be coupled together by a switch 128. In the closed position the switch 128 will insure a closed circuit between the rectifier 102 and the battery 106. The switch 128 is normally closed during the recharging of the battery 106 to provide a DC rail voltage.

It is believed that the rail voltage provided to the battery 106 induces a resonant excitation of the sulfate crystals in the battery 106. The resonant excitation of the crystals may create noise at the base of the transistor 118 which modulates the current through the transistor 118. The noise from the battery 106 may further modulate the rail voltage with a noise signal.

Figure 5:
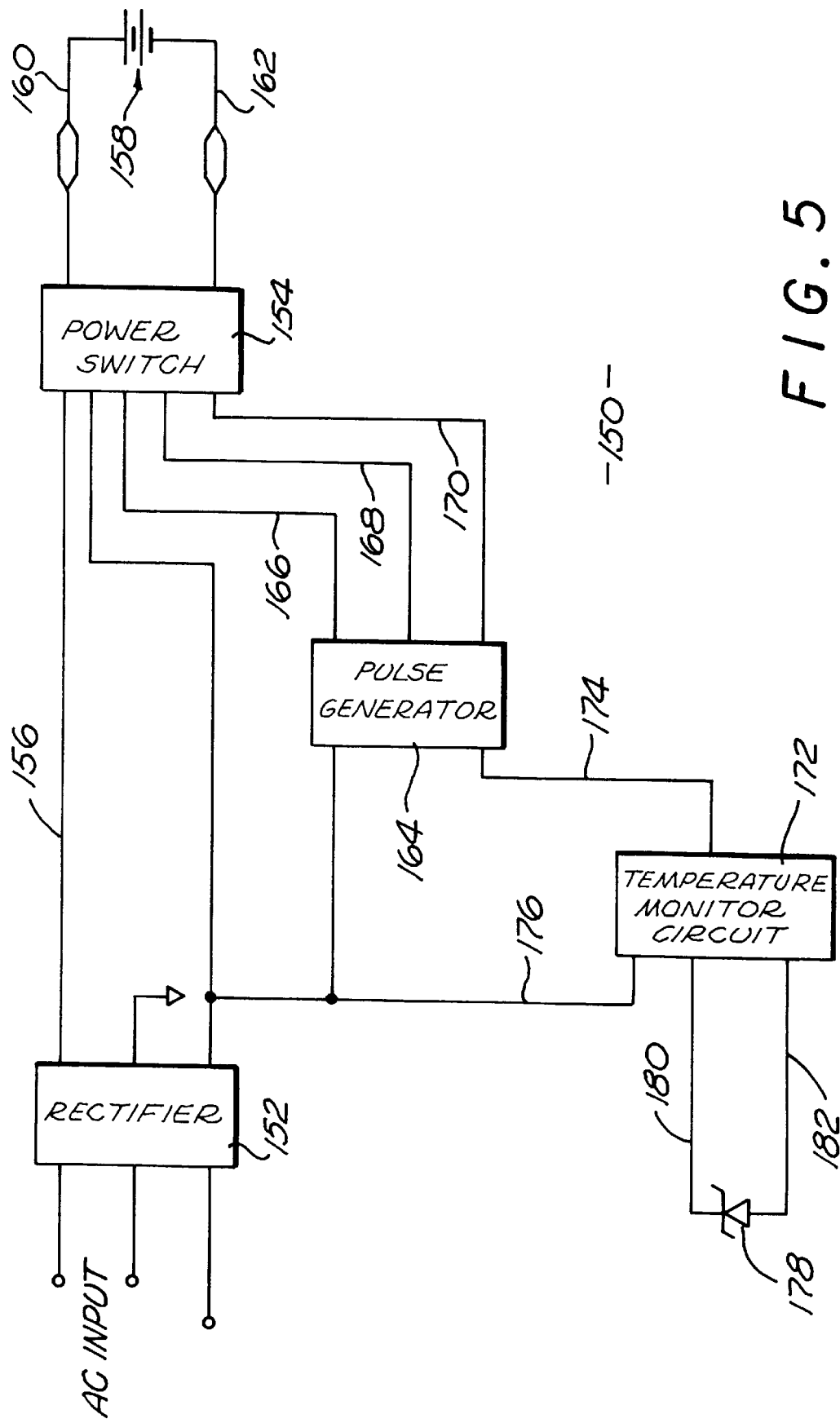
FIG. 5 is a schematic of an alternate embodiment of the apparatus.

FIG. 5 shows another embodiment of a battery charger 150 which modulates a rail voltage. The charger 150 may include a rectifier circuit 152 which rectifies an AC power voltage into a DC rail voltage. The rail voltage is provided to a power switch circuit 154 on line 156. The power switch circuit 154 is connected to a battery 158 by lines 160 and 162. A modulated rail voltage is provided to the battery 158 on lines 160 and 162.

The power switch circuit 154 may be connected to a pulse generator circuit 164 by lines 166, 168 and 170. The pulse generator circuit 164 may provide a series of pulses to the power circuit 154. The pulses may be used to modulate the DC rail voltage provided by the rectifier 152.

The pulse generator circuit 164 and rectifier 152 may be connected to a temperature monitor circuit 172 by lines 174 and 176, respectively. The temperature circuit 172 may be connected to a temperature sensor 178 by lines 180 and 182. The temperature sensor 178 may sense the temperature of the battery 158. The temperature monitor circuit 172 may provide an output signal to the pulse generator circuit 164 on line 174. the output signal may have an amplitude that varies with the temperature of the battery 158. The output signal of the temperature circuit 172 may vary the pulse provided by the pulse generator circuit 164 to the power switch circuit 158.

Figure 6:
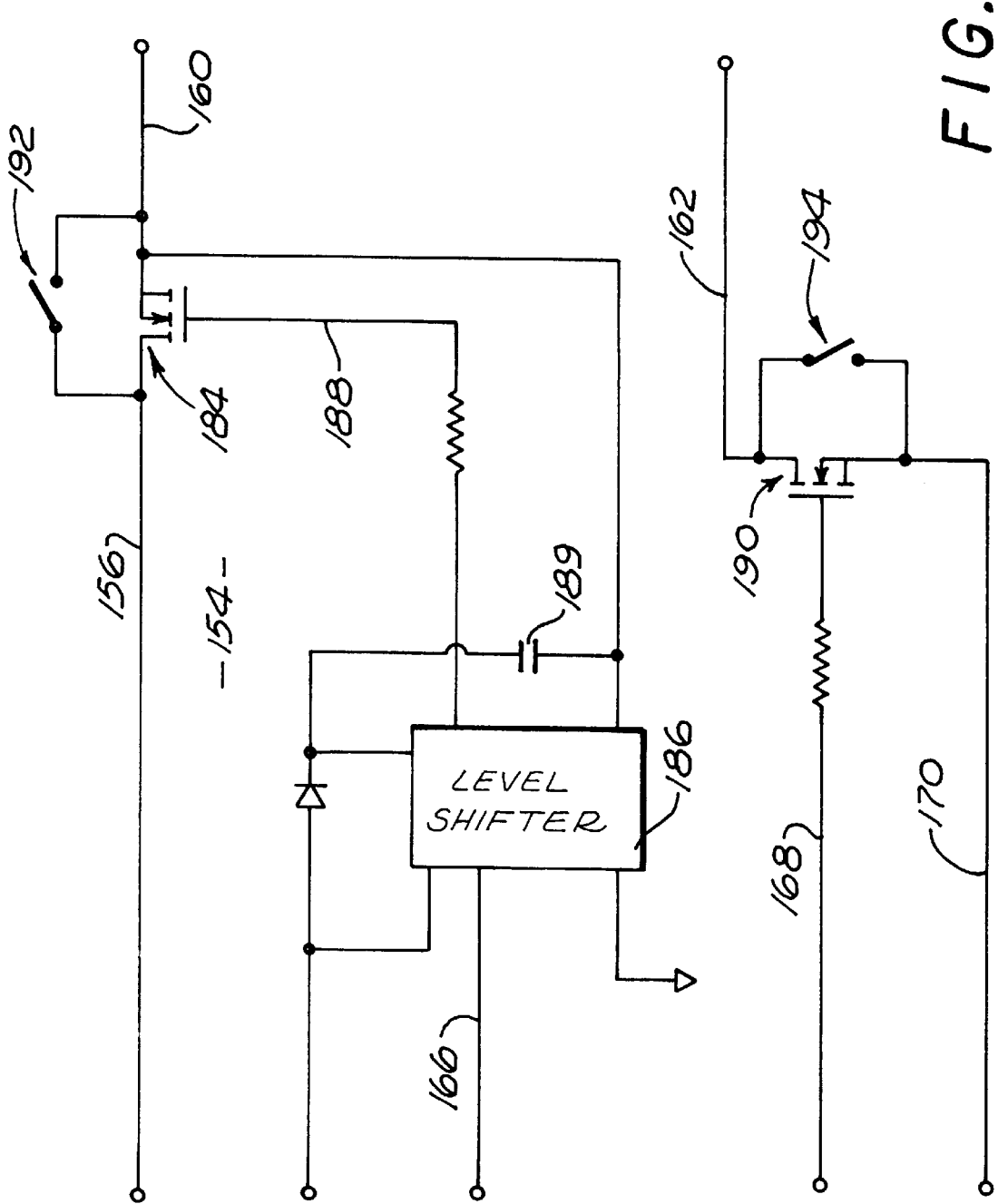
FIG. 6 is a schematic of an embodiment of a power switch circuit.

FIG. 6 shows an embodiment of the power switch circuit 154. The circuit 154 may include a first transistor 184. The transistor 184 may be a field effect transistor (FET) which has a drain D connected to the rail line 156, a source S connected to the battery line 160 and a gate G connected to a level shifter circuit 186 by line 188.

The level shifter 186 is also connected to the output of the pulse generator circuit 164. The level shifter 186 decreases the voltage level of the pulse provided by the pulse generator circuit 164 to the gate of the transistor 184. The pulses modulate the rail voltage provided to the battery 158. The level shifter 188 may be an integrated circuit sold by International Rectifier under the product designation IR2110. Capacitor 189 may provide a voltage which self biases the level shifter 186.

The power circuit 154 may further have a second transistor 190 which has a drain D connected to the battery line 162, a source S connected to line 170 and a gate G connected to the pulse generator circuit 164 by line 168. The pulse generator circuit 164 may provide a series of pulse signals on line 168 to modulate the rail voltage of the battery 158. The pulses on line 168 may be the inverted signal of the pulses provided on line 166.

The power circuit 154 may have a first switch 192 that can be closed to short the battery line 160 to the rail line 156 and by-pass the first transistor 184. Likewise, the circuit 154 may have a second switch 194 that can be closed to by-pass the second transistor 190. In this manner one of the transistors 184 or 190 can be by-passed while the other transistor is being modulated by the oscillator circuit 164.

Figure 7:
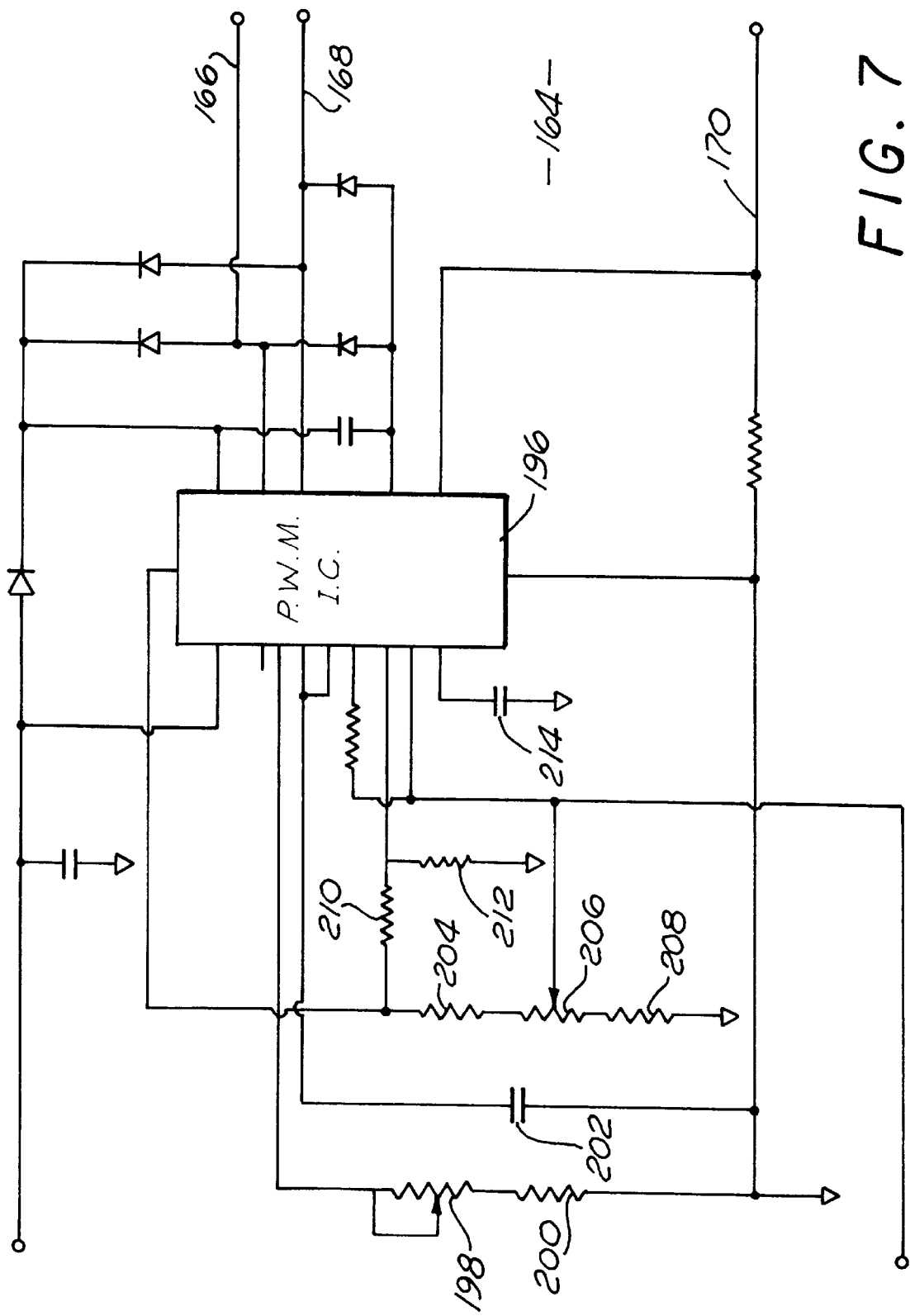
FIG. 7 is a schematic of an embodiment of a pulse generator circuit.

FIG. 7 shows an embodiment of the pulse generator circuit 164. The circuit 164 may include an oscillator and pulse width modulator integrated circuit 196 which provides a series of pulses at a frequency and a duty cycle. The integrated circuit 196 may be a product sold by Unitrode under the part designation 3823BN.

The circuit 164 may have a pair of resistors 198 and 200 and a capacitor 202 which form an RC circuit. The RC circuit is connected to input pins of the integrated circuit 196 which define the frequency of the pulse generated by the circuit. Resistor 198 may be variable so that the time constant of the RC circuit and frequency of the output pulses can be varied. The RC circuit is connected to battery line 170. The modulation of the rail voltage and/or the charging of the battery may create noise in line 170. The noise in line 170 may then vary the input to the integrated circuit 196 and the frequency of the pulses generated by the oscillator 164.

The oscillator circuit 164 may further have resistors 204, 206, 208, 210 and 212 and capacitor 214 which create voltage divider circuits that are connected to the integrated circuit 196 in a manner which sets the duty cycle of the pulses generated by the oscillator 164. Resistor 206 may be variable to allow an operator to change the duty cycle. The output signal of the temperature monitor may be connected to the divider circuits so that the duty cycle varies with changes in the temperature of the battery 158.

In operation, the pulse generator circuit 164 provides pulses to the transistors 184 or 190 to modulate a rail voltage to the battery. The battery may create noise that is provided to the RC circuit of the pulse generator. The noise varies the output of the pulse generator circuit 164, which further modulates the transistors 184 or 190 and the rail voltage provided to the battery 106.

What is claimed is:

1. An apparatus that recharges a battery, comprising:
   a recharger circuit that provides a rail voltage to the battery that is modulated by a noise signal.

2. The apparatus as recited in claim 1, wherein said recharger circuit includes a transistor that modulates said rail voltage and which has a base that is coupled to the battery.

3. The apparatus as recited in claim 2, wherein said recharger circuit includes a capacitor that is connected to said base of said transistor.

4. The apparatus as recited in claim 3, wherein said recharger circuit includes a resistor that is connected to said base.

5. The apparatus as recited in claim 4, wherein said recharger circuit includes an inductor that is connected to said base.

6. The apparatus as recited in claim 5, wherein said recharger circuit includes an pulse generator circuit that is connected to the battery and said base of said transistor.

7. An apparatus that recharges a battery, comprising:
   a recharger circuit that provides a rail voltage to the battery that is modulated with a modulation signal which receives feedback from the battery.

8. The apparatus as recited in claim 7, wherein said recharger circuit includes a transistor that modulates said rail voltage and which has a base that is coupled to the battery.

9. The apparatus as recited in claim 8, wherein said recharger circuit includes a capacitor that is connected to said base of said transistor.

10. The apparatus as recited in claim 9, wherein said recharger circuit includes a resistor that is connected to said base.

11. The apparatus as recited in claim 10, wherein said recharger circuit includes an inductor that is connected to said base.

12. The apparatus as recited in claim 11, wherein said recharger circuit includes an oscillator that is connected to the battery and said base of said transistor.

13. A method for recharging a battery, comprising the steps of:
   a) applying a rail voltage to the battery; and
   b) modulating said rail voltage with a noise signal.

* * * * *